(12) United States Patent
Guha et al.

(10) Patent No.: US 9,868,829 B2
(45) Date of Patent: Jan. 16, 2018

(54) LOW-DENSITY MOLDING COMPOUND CONTAINING SURFACE DERIVATIZED MICROSPHERES

(71) Applicant: CONTINENTAL STRUCTURAL PLASTICS, INC., Auburn Hills, MI (US)

(72) Inventors: Probir Kumar Guha, Troy, MI (US); Michael J. Siwajek, Rochester Hills, MI (US); Michael J. Hiltunen, Rochester, MI (US); Michael Z. Asuncion, Ann Arbor, MI (US)

(73) Assignee: CONTINENTAL STRUCTURE PLASTICS, INC., Auburn Hills, MI (US)

( * ) Notice: Subject to any disclaimer, the term of this patent is extended or adjusted under 35 U.S.C. 154(b) by 54 days.

(21) Appl. No.: 14/751,558

(22) Filed: Jun. 26, 2015

(65) Prior Publication Data
US 2015/0376350 A1 Dec. 31, 2015

Related U.S. Application Data
(60) Provisional application No. 62/018,377, filed on Jun. 27, 2014.

(51) Int. Cl.
*C08J 5/00* (2006.01)
*C08K 7/20* (2006.01)
(Continued)

(52) U.S. Cl.
CPC ............... *C08J 5/00* (2013.01); *C08K 3/0033* (2013.01); *C08K 3/26* (2013.01); *C08K 3/346* (2013.01);
(Continued)

(58) Field of Classification Search
CPC .. C08L 63/10; C08L 67/06; C08K 7/20; C08J 5/00
See application file for complete search history.

(56) References Cited

U.S. PATENT DOCUMENTS 3,505,785 A * 4/1970 Kirkland .................. B01J 2/006
95/88
3,711,432 A 1/1973 Shah
(Continued)

FOREIGN PATENT DOCUMENTS

FR 2914216 A1 10/2008
FR 2914216 A1 10/2008
(Continued)

OTHER PUBLICATIONS

Hamarneh, Asal et al. "DSM Proposes New Roads to Weight Reduction", DSM Bright Science, Brighter Living, Schaffhausen Switzerland, pp. 1-5, www.dsm.com and www.dsmcompositeresins.com.
(Continued)

*Primary Examiner* — Michael A Salvitti
(74) *Attorney, Agent, or Firm* — Avery N. Goldstein; Blue Filament Law PLLC

(57) ABSTRACT

A molded article is provided that includes a resin matrix having a surface, the resin matrix formed from cross-linked polyester resin or vinyl-ester resin. Microspheroids having a mean diameter of from 16 to 45 microns are embedded in the resin matrix. The microspheroids having a specific gravity of between 0.19 and 0.6 and an isotactic crush strength of greater than or equal to 2750 kilopascals (kPa). Surface activating agent alkoxysilane molecules are covalently bonded to each of the microspheroids. Filler particles are also present in the resin matrix. Fibers are also present in the resin matrix. The fibers being natural fibers, glass fibers,
(Continued)

carbon fibers, or a combination thereof. The article has a specific gravity of between 0.80 and 1.25.

25 Claims, 2 Drawing Sheets

(51) Int. Cl.
| | |
|---|---|
| C08K 3/34 | (2006.01) |
| C08K 3/26 | (2006.01) |
| C08K 5/5465 | (2006.01) |
| C08K 3/00 | (2006.01) |
| C08K 7/02 | (2006.01) |
| C08K 9/06 | (2006.01) |

(52) U.S. Cl.
CPC ............ *C08K 5/5465* (2013.01); *C08K 7/02* (2013.01); *C08K 7/20* (2013.01); *C08K 9/06* (2013.01); *C08J 2367/00* (2013.01); *C08K 2003/265* (2013.01); *C08K 2201/003* (2013.01)

(56) References Cited

U.S. PATENT DOCUMENTS

| | | | |
|---|---|---|---|
| 3,769,126 A | 10/1973 | Kolek | |
| 3,940,350 A | 2/1976 | Hess et al. | |
| 3,959,209 A | 5/1976 | Lake | |
| 4,070,286 A * | 1/1978 | Iler .................. | B01J 13/02 |
| | | | 210/198.2 |
| 4,222,929 A | 9/1980 | Shanoski et al. | |
| 4,260,358 A | 4/1981 | Mehnert | |
| 4,262,100 A | 4/1981 | Dunleavy et al. | |
| 4,293,686 A | 10/1981 | Gardner | |
| 4,374,238 A | 2/1983 | Shanoski | |
| 4,396,650 A * | 8/1983 | Lange .................. | C09D 4/00 |
| | | | 427/407.1 |
| 4,416,926 A | 11/1983 | Maglio | |
| 4,451,610 A | 5/1984 | Collister | |
| 4,595,623 A | 6/1986 | Du Pont et al. | |
| 4,643,126 A | 2/1987 | Wilkinson et al. | |
| 5,017,629 A * | 5/1991 | Wilson .................. | C08J 3/226 |
| | | | 523/219 |
| 5,066,693 A | 11/1991 | Gupta | |
| 5,075,393 A | 12/1991 | Thompson | |
| 5,100,935 A | 3/1992 | Iseler et al. | |
| 5,220,047 A | 6/1993 | Pohl et al. | |
| 5,268,400 A | 12/1993 | Iseler et al. | |
| 5,310,686 A | 5/1994 | Sawyers et al. | |
| 5,376,721 A | 12/1994 | McGarry et al. | |
| 5,412,003 A | 5/1995 | Akiyama et al. | |
| 5,447,676 A | 9/1995 | Fukuda et al. | |
| 5,521,232 A | 5/1996 | Gynn et al. | |
| 5,731,367 A | 3/1998 | Lee | |
| 5,854,317 A | 12/1998 | Rinz | |
| 5,998,510 A | 12/1999 | Butler | |
| 6,040,391 A | 3/2000 | Rinz | |
| 6,440,534 B1 | 8/2002 | Wilson | |
| 6,521,162 B2 | 2/2003 | Colley et al. | |
| 6,531,222 B1 | 3/2003 | Tanaka et al. | |
| 6,558,605 B1 | 5/2003 | Wilson | |
| 6,682,811 B1 | 1/2004 | Wilson | |
| 6,699,559 B1 | 3/2004 | Milburn | |
| 6,759,466 B2 | 7/2004 | Steinhäusler et al. | |
| 6,767,950 B2 | 7/2004 | Steinhäusler et al. | |
| 6,780,923 B2 | 8/2004 | Guha et al. | |
| 6,822,058 B1 | 11/2004 | Kramer et al. | |
| 6,878,782 B2 | 4/2005 | Merfeld et al. | |
| 6,977,115 B1 | 12/2005 | Wilson | |
| 6,979,366 B2 | 12/2005 | Chatterji et al. | |
| 7,163,973 B2 | 1/2007 | Ahsan | |
| 7,268,182 B2 | 9/2007 | Sunkara et al. | |
| 7,524,547 B2 | 4/2009 | Beach et al. | |
| 7,700,670 B2 * | 4/2010 | Beach .................. | C08K 7/20 |
| | | | 428/402 |
| 7,829,637 B2 | 11/2010 | Guha et al. | |
| 8,157,908 B2 | 4/2012 | Williams | |
| 8,362,114 B2 * | 1/2013 | Maljkovic .......... | C08G 65/4012 |
| | | | 523/219 |
| 9,018,280 B2 | 4/2015 | Beach et al. | |
| 2002/0132108 A1 | 9/2002 | Ikegawa et al. | |
| 2002/0143094 A1 | 10/2002 | Conroy et al. | |
| 2003/0000311 A1 | 1/2003 | Carpay | |
| 2003/0013792 A1 | 1/2003 | Muhlfeld et al. | |
| 2003/0092823 A1 | 5/2003 | Steinhausler et al. | |
| 2003/0153643 A1 | 8/2003 | Jin et al. | |
| 2004/0000302 A1 | 1/2004 | Kim et al. | |
| 2004/0016371 A1 | 1/2004 | Chatterji et al. | |
| 2004/0081827 A1 | 4/2004 | Datta et al. | |
| 2004/0152803 A1 | 8/2004 | Ahsan | |
| 2004/0220335 A1 | 11/2004 | Damman et al. | |
| 2004/0262801 A1 | 12/2004 | Hojaji et al. | |
| 2005/0001227 A1 | 1/2005 | Niki et al. | |
| 2005/0007657 A1 | 1/2005 | Sakai et al. | |
| 2005/0014533 A1 | 1/2005 | Cave et al. | |
| 2005/0043443 A1 | 2/2005 | Van Mullekom et al. | |
| 2005/0054761 A1 | 3/2005 | Guha et al. | |
| 2005/0070657 A1 | 3/2005 | Elkovitch | |
| 2005/0137307 A1 | 6/2005 | Yeager | |
| 2005/0143533 A1 | 6/2005 | Raviola et al. | |
| 2005/0159511 A1 | 7/2005 | Kramer | |
| 2005/0182205 A1 | 8/2005 | Guha et al. | |
| 2005/0238864 A1 * | 10/2005 | D'Souza .................. | C08J 5/04 |
| | | | 428/292.1 |
| 2006/0199893 A1 | 9/2006 | Schrempf et al. | |
| 2006/0201550 A1 | 9/2006 | Blyth et al. | |
| 2006/0258781 A1 * | 11/2006 | Beach .................. | C08K 7/20 |
| | | | 523/223 |
| 2006/0270760 A1 | 11/2006 | Desai | |
| 2007/0066721 A1 | 3/2007 | Kramer et al. | |
| 2009/0212252 A1 * | 8/2009 | Elgimiabi ............ | C08G 59/184 |
| | | | 252/62 |
| 2010/0116179 A1 | 5/2010 | Baker et al. | |
| 2010/0279100 A1 | 11/2010 | Heikkila et al. | |
| 2012/0000417 A1 | 1/2012 | Grueber et al. | |
| 2013/0172448 A1 * | 7/2013 | Allum .................. | B29B 7/84 |
| | | | 523/466 |
| 2014/0011016 A1 | 1/2014 | Vanimisetti et al. | |
| 2014/0275336 A1 | 9/2014 | Beach et al. | |
| 2015/0376350 A1 * | 12/2015 | Guha .................. | C08J 5/00 |
| | | | 428/325 |
| 2015/0376398 A1 * | 12/2015 | Guha .................. | C03C 25/1095 |
| | | | 523/427 |

FOREIGN PATENT DOCUMENTS

| | | |
|---|---|---|
| JP | 56136838 A | 10/1981 |
| JP | 58157835 A | 9/1983 |
| JP | 02153966 A | 6/1990 |
| JP | 2002179907 A | 6/2002 |
| MX | PA01001579 A | 4/2002 |
| MX | PA04003917 A | 9/2004 |
| MX | PA03007027 A | 10/2004 |
| WO | 9961236 A1 | 12/1999 |
| WO | 9961237 A1 | 12/1999 |
| WO | WO-9961236 A1 | 12/1999 |
| WO | WO-9961237 A1 | 12/1999 |
| WO | 0037241 A1 | 6/2000 |
| WO | 0037242 A1 | 6/2000 |
| WO | 0037243 A1 | 6/2000 |
| WO | WO-0037241 A1 | 6/2000 |
| WO | WO-0037242 A1 | 6/2000 |
| WO | WO-0037243 A1 | 6/2000 |
| WO | 0062961 A1 | 10/2000 |
| WO | WO-0062961 A1 | 10/2000 |
| WO | 2006133433 A2 | 12/2006 |
| WO | WO-2006133433 A2 | 12/2006 |

OTHER PUBLICATIONS

"Unsaturated Polyester." [online] Britannica [Jun. 11, 2013] Retrieved online <http://www.britannica.com/EBchecked/topic/1551220/unsaturated-polyester>.

(56) References Cited

OTHER PUBLICATIONS

Westlund et al. "Applying Appearance Standards to Light Reflection Models." University of Oregon. pp. 501-510 (2001).
"Genuine Mercedes Benz Assessories." pp. 1015 (2011).
Bill Carroll and Steven Hardebeck of Reinhold, Inc., "Surface Analysis of SMC Panels"; Composites 2006, Convention and Trade Show American Composites Manufacturers Association, Oct. 18-20, 2006, St. Louis, MO, USA; pp. 1-25.
Richard et al., Poiydienes possessing terminal ionic groups part 1 preparation of polydeines with terminal quaternary ammonium groups, Br. Polym. J., Sep. 1984, 117-122, vol. 16 Issue 3.

* cited by examiner

LOW-DENSITY MOLDING COMPOUND CONTAINING SURFACE DERIVATIZED MICROSPHERES

RELATED APPLICATIONS

This application claims priority benefit of U.S. Provisional application Ser. No. 62/018,377 filed Jul. 27, 2014; the contents of which are hereby incorporated by reference.

FIELD OF THE INVENTION

The present invention in general relates to low density sheet molding compounds and in particular, to a low-density sheet molding compound containing microspheres having derivatized surfaces.

BACKGROUND OF THE INVENTION

In order to reduce the density of a sheet molding compound (SMC) or bulk molding compound (BMC), high-density inorganic fillers, such as calcium carbonate, are removed from the formulation and replaced with thermoplastic in an effort to maintain surface quality characteristics. Another approach common to the field is to remove a portion of the inorganic filler and replace some of the inorganic filler with hollow glass micro spheres. U.S. Pat. No. 7,700,670 is exemplary of this effort. Owing to the tendency of such glass microspheres to have limited bonding to the hydrophobic surrounding matrix, this reference teaches modifying the surface of the glass micro sphere with a silane to create stronger bonding between the micro spheres and the cured matrix in which the microspheres are encompassed. This greater interaction is observed as higher sheer strength and the microspheres being encrusted in matrix material upon failure in micrographs. While the resulting cured material have been amenable to creating a surface with a high quality surface finish with specular gloss measurement of 70 gloss units (GU), it has proved difficult to pass industry durability tests for paint adhesion required of automotive exterior paints.

While the industry has contemplated articles formed of SMC with specific densities of less than 1.5, as evidenced by U.S. Pat. No. 5,412,003 in order to achieve weight reduction in articles. This has practically proven difficult as high loadings of microspheres leads to a degradation in the handling properties of the pre-cured resin and mechanical properties. One persistent problem with low density SMC articles is poor overcoating adhesion thereby making painting of the article.

Thus, there exists a need for an ultra low-density SMC or BMC article containing hollow glass microspheres that has strong inherent adherence to an over layer.

SUMMARY OF THE INVENTION

A molded article is provided that includes a resin matrix having a surface, the resin matrix formed from cross-linked polyester resin or vinyl-ester resin. Microspheroids having a mean diameter of from 16 to 45 microns are embedded in the resin matrix. The microspheroids having a specific gravity of between 0.19 and 0.6 and an isotactic crush strength of greater than or equal to 2750 kilopascals (kPa). Surface activating agent alkoxysilane molecules are covalently bonded to each of the microspheroids. Filler particles are also present in the resin matrix. Fibers are also present in the resin matrix. The fibers being natural fibers, glass fibers, carbon fibers, or a combination thereof. The article has a specific gravity of between 0.80 and 1.25.

DETAILED DESCRIPTION OF THE INVENTION

Figure 1:
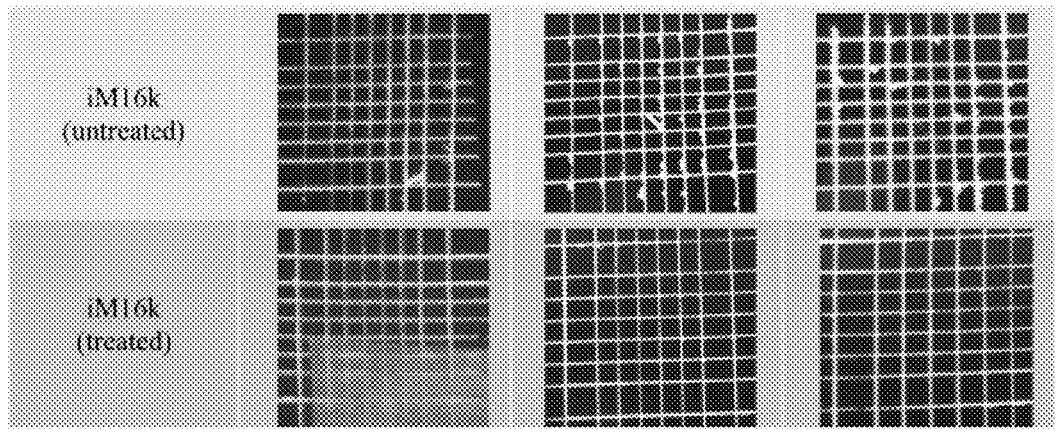
FIG. 1 are photographs of scored triplicate painted surfaces of an SMC after adhesive tape removal for a normalized SMC of Table 1 with untreated microspheroids (top panel) and the same SMC formulation with microsphereoids covalently bonded to methacryloxypropyltrimethoxysilane.

The present invention has utility for the molding of thermoset articles with specific gravities of between 0.80 and 1.25. The inventive articles are able to pass rigorous overcoating adhesion tests and environmental testing while delivering weight savings compared to conventional articles. The reduction in density compared to conventional articles renders the present invention well suited to form vehicles components in general, and in particular those vehicle components receiving a high sheen finish. Exemplary vehicle components produced by the present invention include hoods, deck lids, fenders, doors, and quarter panels.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

According to the present invention, a microspheroid has a mean diameter of between 10 and 120 microns. In certain embodiments, the microspheroids are monodisperse, while in other embodiments, the range of sizes is between 5 and 200 microns. It is appreciated that in forming an inventive article with a balance between low specific gravity in the range of 0.80 to 1.25 and to also promote easy of mixing, the microspheroid is chosen to have a specific gravity of between 0.19 and 0.6 and an isotactic crush strength of greater than or equal to 2750 kilopascals (kPa). In other embodiments, the isotactic crush strength is between 3447 and 194105 kPa. It is appreciated that microspheroids with higher crush strength are less likely to be damaged by sheer mixing associated with SMC and BMC formulation and flow pressures. Loadings of microspheroids are readily modelling based on density and volume to achieve a desired articles specific gravity within the range of 0.80 to 1.25, as detailed Table 1.

TABLE 1

Components in a normalized formulation at 32.05 volume percent microspheroids of various types and the resultant density.

| Component | PHR | % wt | % vol | PHR | % wt | % vol | PHR | % wt | % vol |
|---|---|---|---|---|---|---|---|---|---|
| (18 micron microspheroids 0.6 spec. density 28000 psi crush strength) | 44.55 | 15.29% | 32.05% | 44.55 | 15.46% | 32.05% | 44.55 | 15.64% | 32.05% |
| CaCO₃ filler | 26.35 | 9.04% | 4.20% | 19.77 | 6.86% | 3.15% | 13.19 | 4.63% | 2.10% |
| polyphenyyl sulfide Powder | — | — | — | 3.28 | 1.14% | 1.05% | 6.57 | 2.31% | 2.10% |
| Carbon fiber | | 37.62% | 18.20% | | 38.05% | 18.20% | | 38.49% | 18.20% |
| DENSITY | 1.258 | | | 1.244 | | | 1.230 | | |

| Component | PHR | % wt | % vol | PHR | % wt | % vol | PHR | % wt | % vol |
|---|---|---|---|---|---|---|---|---|---|
| Ex. 1 microspheroids | 34.15 | 12.15% | 32.05% | 34.15 | 12.30% | 32.05% | 34.15 | 12.44% | 32.05% |
| CaCO₃ filler | 26.35 | 9.37% | 4.20% | 19.77 | 7.12% | 3.15% | 13.19 | 4.80% | 2.10% |
| PPS Powder | — | — | — | 3.28 | 1.18% | 1.05% | 6.57 | 2.39% | 2.10% |
| Carbon fiber | | 39.00% | 18.20% | | 39.47% | 18.20% | | 39.95% | 18.20% |
| DENSITY | 1.213 | | | 1.199 | | | 1.185 | | |

| Component | PHR | % wt | % vol | PHR | % wt | % vol | PHR | % wt | % vol |
|---|---|---|---|---|---|---|---|---|---|
| (18 micron microspheroids 0.3 spec. density 6000 psi crush strength) | 22.27 | 8.27% | 32.05% | 22.27 | 8.38% | 32.05% | 22.27 | 8.48% | 32.05% |
| CaCO₃ filler | 26.35 | 9.79% | 4.20% | 19.77 | 7.44% | 3.15% | 13.19 | 5.02% | 2.10% |
| PPS Powder | — | — | — | 3.28 | 1.23% | 1.05% | 6.57 | 2.50% | 2.10% |
| Carbon fiber | | 40.73% | 18.20% | | 41.24% | 18.20% | | 41.75% | 18.20% |
| DENSITY | 1.162 | | | 1.148 | | | 1.133 | | |

| Component | PHR | % wt | % vol | PHR | % wt | % vol | PHR | % wt | % vol |
|---|---|---|---|---|---|---|---|---|---|
| (30 micron microspheroids 0.23 spec. density 3000 psi crush strength) | 17.08 | 6.47% | 32.05% | 17.08 | 6.55% | 32.05% | 17.08 | 6.63% | 32.05% |
| CaCO₃ filler | 26.35 | 9.98% | 4.20% | 19.77 | 7.59% | 3.15% | 13.19 | 5.12% | 2.10% |
| PPS Powder | — | — | — | 3.28 | 1.26% | 1.05% | 6.57 | 2.55% | 2.10% |
| Carbon fiber | | 41.53% | 18.20% | | 42.05% | 18.20% | | 42.60% | 18.20% |
| DENSITY | 1.139 | | | 1.125 | | | 1.111 | | |

| Component | PHR | % wt | % vol | PHR | % wt | % vol |
|---|---|---|---|---|---|---|
| (18 micron microspheroids 0.6 spec. density 28000 psi crush strength) | 44.55 | 15.82% | 32.05% | 44.55 | 16.01% | 32.05% |
| CaCO₃ filler | 6.60 | 2.34% | 1.05% | — | — | — |
| polyphenyyl sulfide Powder | 9.85 | 3.50% | 3.15% | 13.12 | 4.72% | 4.20% |
| Carbon fiber | | 38.94% | 18.20% | | 39.40% | 18.20% |
| DENSITY | 1.215 | | | 1.201 | | |

| Component | PHR | % wt | % vol | PHR | % wt | % vol |
|---|---|---|---|---|---|---|
| Ex. 1 microspheroids | 34.15 | 12.60% | 32.05% | 34.15 | 12.75% | 32.05% |
| CaCO₃ filler | 6.60 | 2.43% | 1.05% | — | — | — |
| PPS Powder | 9.85 | 3.63% | 3.15% | 13.12 | 4.90% | 4.20% |
| Carbon fiber | | 40.43% | 18.20% | | 40.93% | 18.20% |
| DENSITY | 1.170 | | | 1.156 | | |

| Component | PHR | % wt | % vol | PHR | % wt | % vol |
|---|---|---|---|---|---|---|
| (18 micron microspheroids 0.3 spec. density 6000 psi crush strength) | 22.27 | 8.59% | 32.05% | 22.27 | 8.70% | 32.05% |
| CaCO₃ filler | 6.60 | 2.55% | 1.05% | — | — | — |
| PPS Powder | 9.85 | 38.00% | 3.15% | 13.12 | 5.13% | 4.20% |
| Carbon fiber | | 42.29% | 18.20% | | 42.83% | 18.20% |
| DENSITY | 1.119 | | | 1.105 | | |

TABLE 1-continued

Components in a normalized formulation at 32.05 volume percent microspheroids of various types and the resultant density.

| Component | PHR | % wt | % vol | PHR | % wt | % vol |
|---|---|---|---|---|---|---|
| (30 micron microspheroids 0.23 spec. density 3000 psi crush strength) | 17.08 | 6.72% | 32.05% | 17.08 | 6.81% | 32.05% |
| CaCO$_3$ filler | 6.60 | 2.60% | 1.05% | — | — | — |
| PPS Powder | 9.85 | 3.88% | 3.15% | 13.12 | 5.23% | 4.20% |
| Carbon fiber | | 43.15% | 18.20% | | 43.72% | 18.20% |
| DENSITY | 1.097 | | | 1.082 | | |

As used herein a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass.

Figure 2:
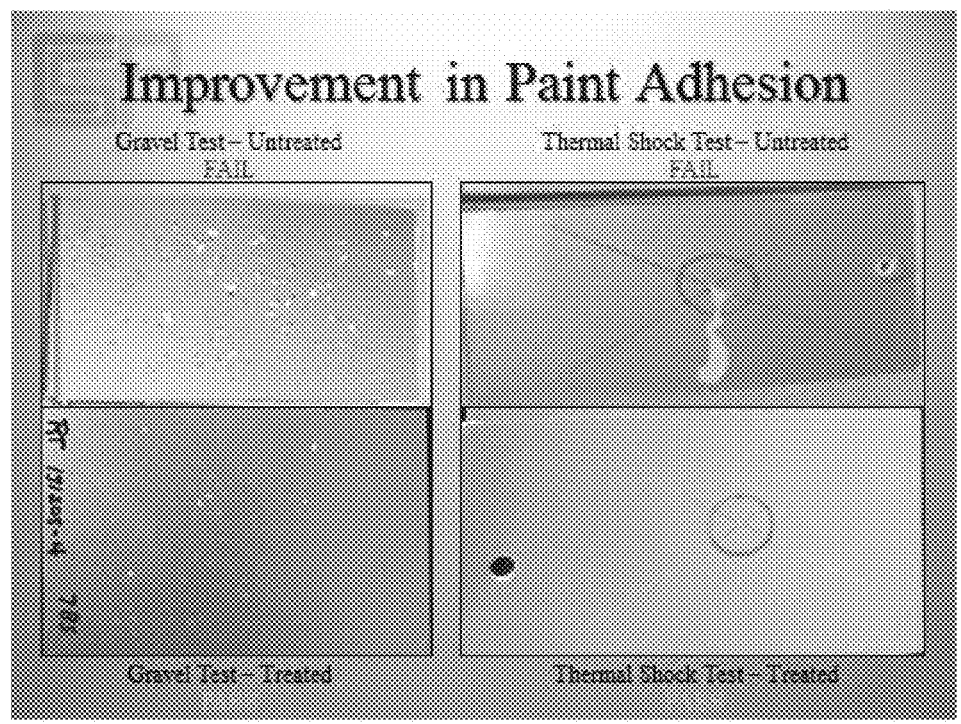
FIG. 2 are photographs of the panels of FIG. 1 that have been subjected to gravel and thermal impact test for untreated (upper panel) and treated (low panel) microspheroids.
Figure 3A:
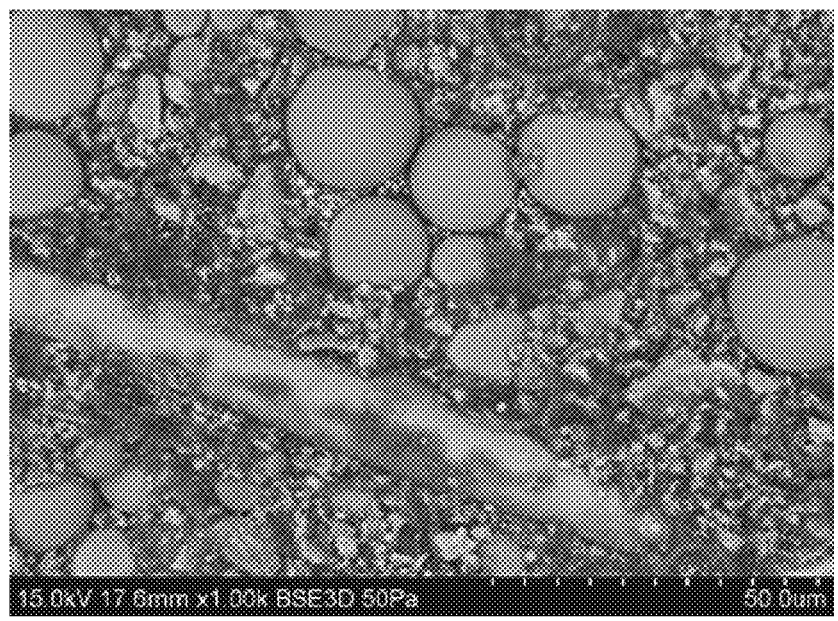
FIG. 3A is a scanning electron micrograph (SEM) of a delaminated SMC panel containing untreated microspheroids per the top panel of FIG. 1.
Figure 3B:
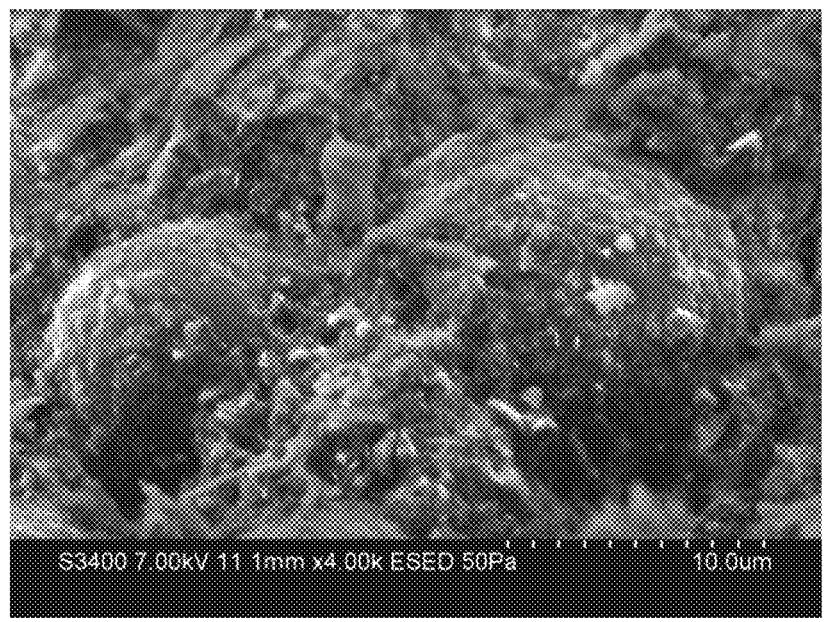
FIG. 3B is an SEM of a delaminated SMC panel containing alkoxysilane treated microspheroids per the bottom panel of FIG. 1.

In order to strengthen interactions between a microspheroid and a surrounding cured matrix, the microspheroid is covalently bonded to microspheroid surface coupling agent. This is referred to herein as treated or pre-treated. In certain inventive embodiments, the microspheroids are pre-treated with a surface coating adherent to the microspheroid surface. Without intending to be bound to a particular theory, the microspheroid surface is modified through covalently coupling to react hydrophilic group, such as hydroxyl groups, on the microspheroid surface to create hydrophobic surface functionality on the microspheroid surface that creates a stronger interaction with the surrounding matrix. This is believed to be manifest by the improved adhesion of an overcoating to an article so formed as seen in FIGS. 1 and 2; and the resin coated microspheroids observed in SEMs of FIG. 3B, compared to FIG. 3A.

In some inventive embodiments, the surface activating agent molecules covalently bonded to the microspheroid surface have a terminal reactive moiety adapted to bond to a surrounding resin matrix during cure. Without intending to be bound to a particular theory, covalent bonding between a cured resin matrix and the microspheroid increases the delamination strength of the resulting SMC or BMC in tests such as ASTM D3359.

A terminal reactive moiety that is reactive with an SMC or BMC resin during cure illustratively includes a tertiary amine-; hydroxyl-; imine-; an ethylenic unsaturation, such as an allyl- or acryl-; or cyano-moiety. It is appreciated that matrix cure can occur through mechanisms such as free radical cure, moisture cure, and combinations thereof.

Tertiary amine terminated thermoplastic are readily prepared. D. H. Richards, D. M. Service, and M. J. Stewart, *Br. Polym. J.* 16, 117 (1984). A representative tertiary amine terminated thermoplastic is commercially available under the trade name ATBN 1300 X 21 from Noveon.

A surface activating agent molecule that bonds to a glass microspheroid is an alkoxysilane where the silane is reactive with the silica surface of the microspheroid. Representative alkoxysilane surface activating agents for the microspheroid illustratively include: 3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis(trimethylsiloxy)methylsilane, (3-glycidoxypropyl) methyldiethoxysilane, (3-glycidoxypropyl) dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, methacryloxypropyltrimethoxysilane ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl)tetrasulfide, and combinations thereof. In certain inventive embodiments, the alkoxysilane surface activating agent includes an ethylenically unsaturated moiety that is reactive under free radical cross-linking conditions so as to covalently bond the microspheroid surface to the surrounding resin matrix.

Alternatively, it is appreciated that microspheroid surface activating agent is readily mixed into the pre-cured SMC or BMC formulation and hollow glass microspheres added thereto to induce microsphere activation prior to initiation of matrix cure. Typically, the surface activating agent is present in concentrations of about 0.05 to 0.5 grams of surface activating agent per gram of microspheroids.

To achieve a desired degree of overcoating adhesion, the surface activating agent is present on the microspheroid surface in an amount to form between 0.1 to 1 monolayer on the surface of the microspheroid. Surface coverage is readily determined based on DSC/TGA to determine the mass of the silane on the surface of the microspheroids, the known surface area of microspheroids per gram, and the cone angle scribed by the surface activating agent on the microspheroid surface. The cone angle is readily calculated using the original algorithm of Tolman (C. A. Tolman, *Chem. Rev.,* 77, 313 (1977); or refinements thereof (D. White, B. C. Taverner, P. G. L. Leach and N. J. Coville, *J. Comp. Chem.,* 14, 1042 (1993)). It is appreciated that the improvements in adhesion are approximately proportional to the number of the surface activating agent per unit of microspheroid surface area between 0.1 and 1 monolayers. This coverage, depending on the specific molecular dimensions of the alkoxysilane corresponds to approximately 0.05-2.2 alkoxysilane residues per square nanometer of microspheroid surface.

In order to increase the number of the surface activating agent per unit of microspheroid surface area, in some embodiments of the present invention, the glass microspheroids are treated with a solution such as in boiling piranha solution (3:1 concentrated H2SO4:H2O2), rinsed with deionized water, and dried in a stream of nitrogen. The freshly cleaned glass microspheroids are then exposed to an alkoxysilane in anhydrous solution or gas phase to self-assemble the silane on the surface.

Microspheroids used in certain inventive embodiments have a mean diameter of between 12 and 45 microns, a specific gravity of between 0.15 and 0.6 and an isotactic crush strength of greater than or equal to 2750 kilopascals (kPa). This size regime within the range of 5 to 200 microns are particularly well suited for formulation with conventional SMC or BMC mixing equipment operating under conventional conditions. In other embodiments, the isotactic crush strength is between 3447 and 194105 kPa. Microspheroids are loaded into a base SMC or BMC from 5 to 20 total weight percent of the resulting formulation, inclusive of filler particulate and filler fiber. The specific amount of microspheroids added into a given molding composition formulation is dependent on factors including desired article density, microspheroid size dispersion and mean particle dimension, required article strength, required article shrinkage, and required article surface smoothness. It has been surprisingly found that a microspheroid volume of between 25 and 40 volume percent achieves an optimal balance of overall properties in an article. Table 1 shows the specific gravity for various formulations that vary as to the nature of microspheroids; normalized to 32.04 volume percent microspheroids.

A principal component of an SMC or BMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites. Typical SMC and BMC formulations are described in U.S. Pat. Nos. 4,260,358; 4,643,126; 5,100,935; 5,268,400; 5,854,317; 6,780,923; or 7,829,637.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended or dissolved in an ethylenically unsaturated monomer that copolymerizes with the resin during the thermoset process. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The inventive molding composition in certain inventive embodiments includes a particulate filler. Particulate fillers operative in such molding compositions illustratively include calcium carbonate, calcium silicate, alumina, ATH, silica, talcs, dolomite, vermiculite, diatomaceous earth, kaolin clay, graphite, metal and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent of the molding composition total weight. Typical filler sizes are from 0.1 to 50 microns.

In some inventive embodiments, the filler particle size smaller than the microspheroid. By way of example, 6 micron diameter calcium carbonate particulate filler is well suited for usage with microspheroids as used herein.

A fiber filler is typically added to provide strength relative to a particulate filler. Fiber fillers operative herein illustratively include glass, carbon, polyimides, polyesters, polyamides, and natural fibers such as cotton, silk, and hemp. Preferably, the fiber filler is glass fiber in the form of chopped glass strands. More preferably, chopped glass strands are provided in lengths ranging from 5 to 50 millimeters. Fiber fillers are typically present from 0 to 80 total weight percent. It is appreciated that mixtures of various types of fibers are readily made to achieve desired strengths and article densities.

A mold release agent is typically provided to promote mold release. Mold releases include fatty acid salts illustratively including oleates, palmitates, sterates of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent.

A nanocomposite clay is lipophilic and has domains of a size that do not contribute to the molded article surface roughness. An alkyl quaternary ammonium bentonite nanocomposite clay operative herein is commercially available (Southern Clay Products, CLOISITE® 10A). Clay domains are on the order of 50 to 150 nanometers and have a platelet thickness of one to 10 nanometer and are optionally used alone, or in combination with a polymeric moisture reducing additive to enhance the processability of an inventive formulation while decreasing the moisture absorption rate. Such nanocomposite clay is typically present up to 10 total weight percent.

It is appreciated that the present invention optionally also incorporates additional additives illustratively including flame retardants, plasticizers, colorants, and other processing additives conventional to the art.

The present invention is further illustrated with respect to the following non-limiting examples:

Example 1

20 micron glass microspheroids having a specific gravity of 0.46 and an isotactic crush strength of 16,500 psi are mixed with 3-isocyanatopropyltriethoxysilane 1% (w/w) in anhydrous toluene solution for 24 hours or gas phase to self-assemble the silane on the surface. Toluene was freshly distilled from sodium. After the glass beads had been removed from the solution, followed by a sequence of 2 washes with anhydrous toluene, deionized water and ethanol were employed to remove any physisorbed isocyanatopropyltriethoxysilane. The microspheroids are dried in nitrogen atmosphere.

Example 2

The treated glass microspheroids of Example 1 are included in the conventional sheet molding compound are with a sheet molding compound formulation containing unsaturated polyester resin, thermoplastic additives, organic peroxides, inhibitor, calcium carbonate filler, mold as detailed in Table 2. A plaque was formed and coated with a commercial paint overlayer.

Comparative Example

Example 2 is repeated with the replacement of the 20 micron glass microspheroids that have not been pre-treated with 3-isocyanatopropyltriethoxysilane as detailed in Table 2. A plaque was formed and coated with a commercial paint overlayer. Failure of tests is shown in the left hand panels of FIGS. 1 and 2 and detailed in Example 5.

Example 3

A formulation is produced with 20 micron glass microspheroids that have been pre-treated with 3-isocyanatopropyltriethoxysilane per Example 1. The glass microspheroids having a specific gravity of 0.15. The formulation being 51% by total weight of the treated glass microspheroids. The formulation having a density of 0.80 g/cm³.

Example 4

A formulation is produced with 20 micron glass microspheroids that have been pre-treated with 3-isocyanatopropyltriethoxysilane per Example 1. The glass microspheroids having a specific gravity of 0.19. The formulation being 51% by total weight of the treated glass microspheroids. The formulation having a density of 0.80 g/cm³.

TABLE 2

Ingredients in test SMCs of Examples 2-4 and Comparative Example with amounts given in parts per hundred (phr).

| Ingredients | Comparative Ex. | Ex. 2 | Ex. 3 | Ex. 4 |
|---|---|---|---|---|
| Calcium Stearate | 4.02 | 4.02 | 1 | 1 |
| Stearic Acid | 1.45 | 1.45 | 3 | 3 |
| Anti-oxidant | 0.06 | 0.06 | 0.06 | 0.06 |
| Styrene | 5.02 | 5.02 | | |
| Polyester Resin | 49.61 | 49.61 | 51 | 51 |
| Solid acrylic particulate resin | 2.46 | 2.46 | 12 | 12 |
| Styrene Block copolymer | 3.93 | 3.93 | 15 | 15 |
| Wacker C-501 Blend | 3.45 | 3.45 | | |
| Saturated polyester resin | 25.97 | 25.97 | 17 | 17 |
| Divinylbenzene 63.5% | 1.48 | 1.48 | 5 | 5 |
| Wetting and Dispersing Additives for Unsaturated Polyester and Epoxy Systems | 0.94 | 0.94 | 2 | 2 |
| Polypropylene glycol | 4.02 | 4.02 | | |
| Cure inhibitor | 1.03 | 1.03 | 0.08 | 0.08 |
| Water | 0.02 | 0.02 | 0.27 | 0.27 |
| tert-Butyl peroxybenzoate | 1.10 | 1.10 | 1.5 | 1.5 |
| 1,1-Di(tert-butylperoxy)cyclohexane 80% | 1.10 | 1.10 | | |
| Glass microspheroids (untreated) | 42.23 | 0.00 | 0.00 | 0.00 |
| Glass microspheroids (treated) | 0.00 | 42.43 | 30 | 43 |
| kaolin clay | 21.32 | 21.32 | | |
| CaCO₃ | 15.07 | 15.07 | | |
| Polyurethane B-side | 7.15 | 7.15 | 9 | 9 |

Example 5

The plaques of Example 2 and the comparative example are scored and tested by ASTM D3359. The results are shown in FIG. 1 in triplicate. Separate plaques of Example 2 and the comparative example are tested by gravel and thermal shock tests according to SAE J400 and Ford Laboratory Test Method BI 117-01, respectively.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:
1. A molded article comprising:
a resin matrix having a surface;
microspheroids having a mean diameter of from 16 to 45 microns in said resin matrix, said microspheroids consisting of acid cleaned glass microspheroid surfaces to increase the number of the surface activating agent per unit of microspheroid surface area, said microspheroids having a specific gravity of between 0.15 and 0.6 and an isotactic crush strength of greater than or equal to 2750 kilopascals (kPa);
a plurality of surface activating agent molecules covalently bonded to each of said acid cleaned glass microspheroid surfaces _in an amount to form between 0.1 to 1 monolayer on each of said glass microspheroids, said plurality of surface activating agent molecules being alkoxysilanes;
filler particles in said resin matrix; and
fibers in said resin matrix, wherein the article has a specific gravity of between 0.80 and 1.25 and passes a gravel test according to SAE J400.

2. The article of claim 1 further comprising an overcoating layer adhered to the surface, said overcoating layer being commercial paint.

3. The article of claim 1 wherein said microspheroids are present from 10 to 51 total weight percent of the formulation.

4. The article of claim 1 wherein the isotactic crush strength of greater than or equal to 6895 kilopascals (kPa).

5. The article of claim 1 wherein the isotactic crush strength of greater than or equal to 55,158 kilopascals (kPa).

6. The article of claim 1 wherein said plurality of surface activating agent molecules each comprise a moiety that is adapted to covalently bond to said resin matrix.

7. The article of claim 6 wherein said moiety is one of isocyanyl, amino, epoxy, allyl, or methacryl.

8. The article of claim 5 wherein said surface activating agent is a heteroatom functionally terminated thermoplastic coating.

9. The article of claim 8 wherein said coating has a heteroatom containing terminus moiety of: a tertiary amine, a hydroxyl-, an imine- or a cyano-moiety.

10. The article of claim 1 wherein said glass microspheroids have an aspect ratio of normal diameters of between 1.1 and 1.2.

11. The article of claim 1 wherein said resin is a polyester.

12. The article of claim 1 wherein said resin is an epoxy, or a polyurethane.

13. A molded article comprising:
a resin matrix having a surface, said resin matrix formed from cross-linked polyester resin or vinyl-ester resin;
microspheroids having a mean diameter of from 16 to 45 microns in said resin matrix, said microspheroids consisting of acid cleaned glass microspheroid surfaces to increase the number of the surface activating agent per unit of microspheroid surface area, said microspheroids having a specific gravity of between 0.15 and 0.42;
a plurality of surface activating agent molecules covalently bonded to each of said acid cleaned glass microspheroid surfaces in an amount to form between 0.1 to 1 monolayer on each of said glass microspheroids, said plurality of surface activating agent molecules being alkoxysilanes;
filler particles in said resin matrix; and
fibers in said resin matrix, wherein the article has a specific gravity of between 0.80 and 1.25 and passes a gravel test according to SAE J400.

14. The article of claim 13 further comprising an overcoating layer adhered to the surface, said overcoating layer being commercial paint.

15. The article of claim 13 wherein said microspheroids are present from 10 to 51 total weight percent of the formulation.

16. The article of claim 13 wherein the isotactic crush strength of greater than or equal to 6895 kilopascals (kPa).

17. The article of claim 13 wherein the isotactic crush strength of greater than or equal to 55,158 kilopascals (kPa).

18. The article of claim 13 wherein said plurality of surface activating agent molecules each comprise a moiety that is adapted to covalently bond to said resin matrix.

19. The article of claim 18 wherein said moiety is one of isocyanyl, amino, epoxy, allyl, or methacryl.

20. The article of claim 18 wherein said surface activating agent is a heteroatom functionally terminated thermoplastic coating.

21. The article of claim 20 wherein said coating has a heteroatom containing terminus moiety of: a tertiary amine, a hydroxyl-, an imine- or a cyano-moiety.

22. The article of claim 13 wherein said resin is a polyester.

23. The article of claim 1 wherein said resin matrix is formed from cross-linked polyester resin or vinyl-ester resin.

24. The article of claim 1 wherein said microspheroids are present from 12.15 to 20 total weight percent of the formulation.

25. The article of claim 13 wherein said microspheroids are present from 12.15 to 20 total weight percent of the formulation.

* * * * *